United States Patent
Wang et al.

(10) Patent No.: US 11,327,717 B2
(45) Date of Patent: May 10, 2022

(54) LOOK-UP TABLE WITH INPUT OFFSETTING

(71) Applicant: SambaNova Systems, Inc., Palo Alto, CA (US)

(72) Inventors: Mingran Wang, San Jose, CA (US); Xiaoyan Li, San Jose, CA (US); Yongning Sheng, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 16/688,069

(22) Filed: Nov. 19, 2019

(65) Prior Publication Data
US 2021/0149634 A1 May 20, 2021

(51) Int. Cl.
*G06F 7/544* (2006.01)

(52) U.S. Cl.
CPC ...... *G06F 7/544* (2013.01); *G06F 2207/5354* (2013.01)

(58) Field of Classification Search
CPC .......... G06F 7/544; G06F 17/10; G06F 17/17; G06F 7/57; G06F 7/575; G06F 1/03; G06F 2207/5354; G06N 3/063; G06N 3/0481
See application file for complete search history.

(56) References Cited

U.S. PATENT DOCUMENTS

| | | | |
|---|---|---|---|
| 5,365,465 A | | 11/1994 | Larson |
| 5,506,797 A | * | 4/1996 | Koshiba ................ G06F 1/0307 708/204 |
| 9,411,756 B2 | * | 8/2016 | Nogueira ................ G06F 17/17 |
| 10,698,853 B1 | | 6/2020 | Grohoski et al. |
| 11,106,430 B1 | * | 8/2021 | Kadkol ...................... G06F 1/03 |
| 2005/0160129 A1 | * | 7/2005 | Endo ...................... G06F 7/544 708/490 |

(Continued)

FOREIGN PATENT DOCUMENTS

| | | |
|---|---|---|
| TW | I318337 B | 12/2009 |
| TW | I557641 B | 11/2016 |

(Continued)

OTHER PUBLICATIONS

M. A. Iqbal and U. S. Awan, "Reconfigurable Processor Architecture For High Speed Applications," 2009 IEEE International Advance Computing Conference, Patiala, 2009, pp. 624-629, doi: 10.1109/IADCC.2009.4809084. (Year: 2009).*

(Continued)

*Primary Examiner* — Emily E Larocque
*Assistant Examiner* — Carlo Waje
(74) *Attorney, Agent, or Firm* — Haynes Beffel & Wolfeld LLP; Sikander Kahn; Bruce Young

(57) ABSTRACT

A computation unit computes a function f(I). The function f(I) has a target output range over a first domain of an input I encoded using a first format. A first circuit receives the encoded input I in the first format including X bits, to add an offset C to the encoded input I to generate an offset input SI=I+C, in a second format including fewer than X bits. The offset C is equal to a difference between the first domain in f(I) and a higher precision domain of the second format for the offset input SI. A second circuit is operatively coupled to receive the offset input SI in the second format, to output a value equal to a function f(SI) to provide an encoded output value f(I).

28 Claims, 9 Drawing Sheets

(56) References Cited

U.S. PATENT DOCUMENTS

| | | | |
|---|---|---|---|
| 2012/0030203 | A1 | 2/2012 | Chiang et al. |
| 2013/0262539 | A1 | 10/2013 | Wegener |
| 2013/0339564 | A1* | 12/2013 | Nogueira .............. G06F 13/36 710/305 |
| 2014/0040334 | A1* | 2/2014 | Burgess ............... H04L 9/0631 708/235 |
| 2014/0222883 | A1 | 8/2014 | Pineiro et al. |
| 2017/0054449 | A1 | 2/2017 | Mani et al. |
| 2017/0244982 | A1 | 8/2017 | Fuldseth et al. |
| 2017/0322774 | A1* | 11/2017 | Zhang .............. H03K 19/17728 |
| 2018/0174022 | A1 | 6/2018 | Young |
| 2018/0220144 | A1 | 8/2018 | Su et al. |
| 2018/0329681 | A1* | 11/2018 | Zhang ...................... G06F 7/57 |
| 2019/0042244 | A1 | 2/2019 | Henry et al. |
| 2019/0042924 | A1 | 2/2019 | Pasca et al. |
| 2019/0114139 | A1* | 4/2019 | Zhang ..................... G06F 7/544 |
| 2019/0147323 | A1* | 5/2019 | Li .......................... G06N 3/063 706/15 |
| 2019/0205734 | A1 | 7/2019 | Guntoro |
| 2019/0279075 | A1 | 9/2019 | Liu et al. |
| 2020/0159544 | A1 | 5/2020 | Shah et al. |
| 2020/0159692 | A1 | 5/2020 | Shah et al. |
| 2020/0371805 | A1 | 11/2020 | Lutz |
| 2021/0034982 | A1* | 2/2021 | Sather .................... G06N 20/00 |
| 2021/0064341 | A1* | 3/2021 | Kuo ........................ G06F 7/556 |
| 2021/0096816 | A1* | 4/2021 | Wang ..................... G06F 7/483 |
| 2021/0216873 | A1 | 7/2021 | Liu |

FOREIGN PATENT DOCUMENTS

| | | |
|---|---|---|
| WO | 2010142987 A1 | 12/2010 |
| WO | 2018/100920 A1 | 6/2018 |
| WO | 2021046274 A1 | 3/2021 |
| WO | 2021126530 A1 | 6/2021 |

OTHER PUBLICATIONS

K. Olukotun, "Designing Computer Systems for Software 2.0," ISCA 2018 Keynote, Jun. 2018. Retrieved from the internet <https://iscaconf.org/isca2018/docs/Kunle-ISCA-Keynote-2018.pdf> (Year: 2018).*

"Activation Function," Downloaded from Wikipedia on Aug. 16, 2019, 3 pages.

Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.

Bendersky "The Softmax function and its derivative," https://eli.thegreenplace.net/2016/the-softmax-function-and-its-derivative, Oct. 18, 2016, 11 pages.

Cook, "Comparing bfloat16 range and precision to other 16-bit numbers," www.johndcook.com/blog/2018/11/15/bfloat16, downloaded on Nov. 15, 2018, 4 pages.

Eppler et al., "High speed neural network chip for trigger purposes in high energy physics," IEEE, Proc. of the conference on design, automation and test in Europe, Feb. 1998, 8 pages.

Gomar et al. "Precise digital implementations of hyperbolic tanh and sigmoid function," 2016 50th Asilomar Conference on Signals, Systems and Computers, Nov. 6-9, 2016, 4 pages.

Intel BLOAT16—Hardware Numerics Definition White Paper, Rev. 1.0, Nov. 2018, 7 pages.

Ioffe, et al., "Batch Normalization: Accelerating Deep Network Training by Reducing Internal Covariate Shift," Cornell University, available at https://arxiv.org/abs/1502.03167, Mar. 2, 2015, 11 pages.

Koeplinger et al., "Spatial: A Language and Compiler for Application Accelerators," PLDI '18, Jun. 18-22, 2018, Association for Computng Machinery, 16 pages.

Lin et al., "A Digital Circuit Design of Hyperbolic Tangent Sigmoid Function for Neural Networks," 2018 IEEE Int'l Symp. on Circuits and Systems, May 18-21, 2018, 4 pages.

Petersen, "Softmax with cross-entropy," https://mattpetersen.github.io/softmax-with-cross-entropy, Jun. 25, 2017, 19 pages.

Prabhakar, et al., "Plasticine: A Reconfigurable Architecture For Parallel Patterns", pp. 389-402, IEEE, Jun. 24, 2017.

Turkson et al. "Artificial neural network applications in the calibration of spark-ignition engines: An overview," Engineering Science and Technology, an International Journal, vol. 19, Issue 3, Sep. 2016, 1346-1359.

U.S. Appl. No. 16/260,548 "Matrix Normal/Transpose Read and a Reconfigurable Data Processor Including Same," Jan. 29, 2019, 43 pages.

U.S. Appl. No. 16/407,675 "Control Flow Barrier and Reconfigurable Data Processor ," May 9, 2019, 32 pages.

U.S. Appl. No. 16/504,627 "Quiesce Reconfigurable Data Processor," Jul. 8, 2019, 78 pages.

U.S. Appl. No. 16/536,192 "Compiler Flow Logic for Reconfigurable Architectures ," Aug. 8, 2019, 57 pages.

U.S. Appl. No. 16/572,516 "Efficient Execution of Operation Unit Graphs on Reconfigurable Architectures Based on User Specification ," Sep. 16, 2019, 63 pages.

U.S. Appl. No. 16/560,057 "Sigmoid Function in Hardware and a Reconfigurable Data Processor Including Same" Sep. 4, 2019, 35 pages.

U.S. Appl. No. 16/572,527 "Performance Estimation-Based Resource Allocation for Reconfigurable Architectures" Sep. 16, 2019, 68 pages.

U.S. Appl. No. 16/590,058 "Computation Units for Functions Based on Lookup Tables" Oct. 1, 2019, 37 pages.

U.S. Appl. No. 16/695,138 "Computational Units for Batch Normalization" Nov. 25, 2019, 47 pages.

U.S. Appl. No. 16/718,094 "Computational Units for Element Approximation" Dec. 17, 2019, 87 pages.

Wikipedia "bfloat16 floating-point format," downloaded Aug. 19, 2019, 2 pages.

Kumar, Pasupuleti Sirish et al, "Low Complex & High Accuracy Computation Approximations to Enable On-Device RNN Applications", 2019 IEEE International Symposium On Circuits and Systems (ISCAS), IEEE, May 26, 2019 (May 26, 2019), pp. 1-5.

PCT/US2020/061862—International Search Report and Written Opinion dated Mar. 10, 2021, 11 pages.

PCT/US2020/49285—International Search Report and Written Opinion dated Nov. 18, 2020, 13 pages.

Wikipedia "Batch normalization," downloaded Feb. 25, 2021, 10 pages.

Wikipedia "Floor and ceiling functions," downloaded Aug. 12, 2019, 5 pages.

MISB ST 1201.4, "Floating Point to Integer Mapping," Feb. 28, 2019, pp. 1-21.

PCT/US2020/053344—International Search Report and Written Opinion dated Dec. 21, 2020, 11 pages.

PCT/US2020/061060—International Search Report and Written Opinion dated Mar. 4, 2021, 14 pages.

U.S. Appl. No. 16/590,058—Response to Non-Final Office Action dated Jun. 1, 2021 as filed on Aug. 18, 2021, 20 pages.

U.S. Appl. No. 16/695,138—Response to Non-Final Office Action dated Apr. 22, 2021 as filed Jul. 22, 2022, 8 pages.

TW 109129892—First Office Action dated Aug. 12, 2021, 19 pages.

TW 109134270—First Office Action dated Sep. 30, 2021, 6 pages.

Podobas et al., A Survey on Coarse-Grained Reconfigurable Architectures From a Performance Perspective, IEEEAccess, vol. 2020. 3012084, Jul. 27, 2020, 25 pages.

M. Emani et el., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.

U.S. Appl. No. 16/590,058 Notice of Allowance, dated Nov. 3, 2021, 15 pages.

U.S. Appl. No. 16/695,138 Final Office Action, dated Oct. 21, 2021, 12 pages.

U.S. Appl. No. 16/718,094 Notice of Allowance, dated Jun. 14, 2021, 15 pages.

(56) References Cited

OTHER PUBLICATIONS

TW 109129892—Response to First Office Action dated Oct. 21, 2021, 17 pages.
TW 109129892 Notice of Allowance, dated Nov. 1, 2021, 3 pages.

* cited by examiner

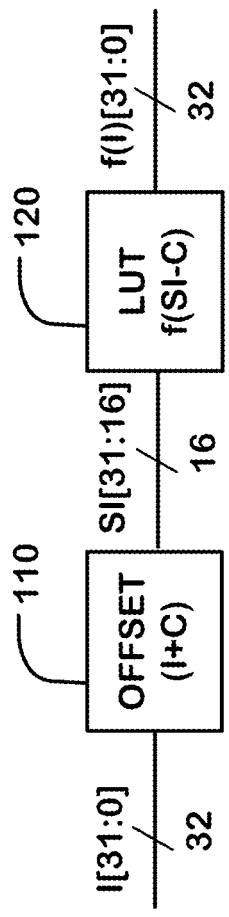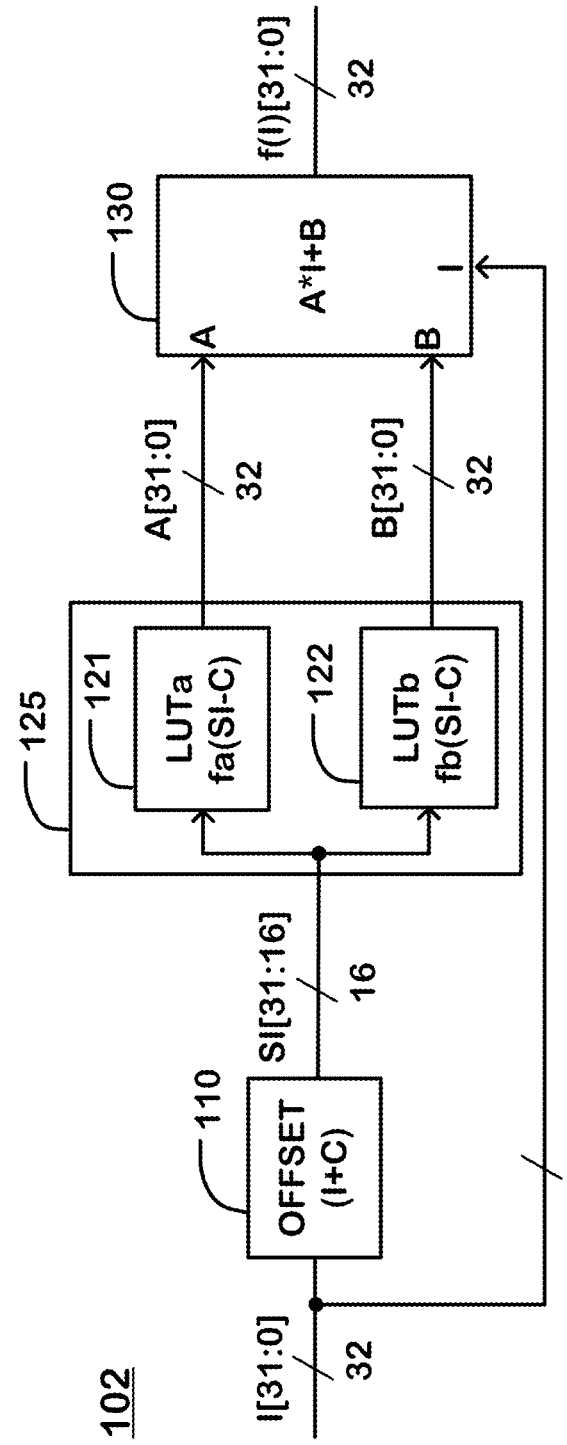

LOOK-UP TABLE WITH INPUT OFFSETTING

BACKGROUND

Field

The present invention relates to technology for implementation of a circuit to provide an output equal to a function of an input variable, suitable for use in integrated circuits, including such circuits using floating-point format input values to produce floating-point format outputs.

Description of Related Art

Algorithms executed in data processors can include steps that receive an input variable, I, and provide an output f(I). For one simple example, f(I) may be the function e'. Also, more complex functions that include mathematical combinations of variables might be needed. These functions can be implemented using lookup tables, which receive the input, and look up an entry in the table holding the corresponding output value. Also, these functions can be implemented using combinational logic, that can be compiled for example using electronic design automation based on a lookup table.

In systems operating with input variables that have a wide dynamic range, the input variables may be represented using a floating-point format, such as the format known as FP32, FP16, BF16, or in a variety of other formats. (Intel "BFLOAT16—Hardware Numerics Definition White Paper" November 2018; IEEE 754-2008). In the case of a 32-bit input format, there are $2^{32}$ possible input values, with, in some cases, a corresponding number of output values. When output values are also provided in a 32-bit format (4 bytes), a lookup table providing such output values can consume about 16 gigabytes GB ($4 \times 2^{32}$) of memory. Also, a combinational circuit implemented based on such a large table, can be quite complicated, consuming area and power.

It is desirable to provide a way to implement circuit to provide an output f(I) that can reduce requirements for data processing resources including memory, while limiting error rates due to resolution of a floating point format.

SUMMARY

The present technology provides a way to implement a function f(I) that can reduce processing requirements, including memory requirements, while reducing error rates due to variations in resolution of floating point formats over the range of values that can be encoded. The technique can be applied in an integrated circuit, such as in a reconfigurable data processor.

A computation unit is described that computes a function f(I). The function f(I) has a target output range over a first domain of an encoded input I, in which the rate of change of output values can be high, or in which greater resolution may be required for a given use of the data. The computation unit in this example comprises a first circuit receiving an encoded input I in a first format including X bits (e.g. FP32), to add an offset C to the encoded input I to generate an offset input SI=I+C, in a second format including fewer than X bits (e.g. BF16). The offset C is equal to a difference between the first domain of inputs for f(I) which produces outputs in the target range, and a higher precision domain (e.g. a region of smaller or negative exponents closer to an encoding of 1) of the encoding format for the offset input SI. The computation unit in this example comprises a second circuit operatively coupled to receive the offset input SI in the second format, to output a value equal to a function f(SI-C) that can be, or can be used to provide, an encoded output value f(I). In some embodiments, the encoded output value f(I) is provided in the first format, including X bits.

In one embodiment, the second circuit can comprise memory storing a lookup table with entries for the encoded output value f(I), the entries addressed by the offset input SI. The encoded input I can have X bits (e.g. 32), the offset input SI can have less than X bits (e.g. 16 in the case in which SI is encoded in the BF16 format), and the lookup table in the second circuit can have less than $2^X$ entries, such as, up to $2^{16}$ entries.

In an alternative embodiment, the second circuit can comprise an interpolation circuit, including for interpolation based on two factors, memory storing a first lookup table with entries for a first parameter A addressed by the offset input SI, and a second lookup table with entries for a second parameter B addressed by the offset input SI. The encoded input I can have X bits (e.g. 32), the offset input can have less than X bits (e.g. 16 in the case in which SI is encoded in the BF16 format), and the first and second lookup tables in the second circuit can each have less than $2^X$ entries, such as, up to $2^{16}$ entries. The first and second parameters can be provided to a third circuit, which can be operatively coupled to the encoded input I, to compute the encoded output value f(I). The third circuit can execute an interpolation function such as (A*I+B) or other function using the encoded input I and the first and second parameters. In some embodiments, the encoded input I, the outputs of the first and second lookup tables, and the encoded output value can all be encoded using the first format, having X bits.

The first circuit can have an input register for the encoded input I and a register that stores a constant, and include logic to add the constant to the encoded input I, the constant representing the offset, and translate the result to the second format for use as the encoded input.

Methods as described herein can be applied in data processing systems to efficiently compute a function f(I).

Reconfigurable processors as described herein, including an array of configurable units, can include configurable units configured to implement a computation unit to efficiently compute a function f(I).

Other aspects and advantages of the present invention can be seen on review of the drawings, the detailed description and the claims, which follow.

BRIEF DESCRIPTION OF THE DRAWINGS

FIG. 1A is a simplified schematic diagram illustrating a computation unit as described herein.

FIG. 1B is a simplified schematic diagram illustrating an alternative computation unit.

DETAILED DESCRIPTION

Figure 2:
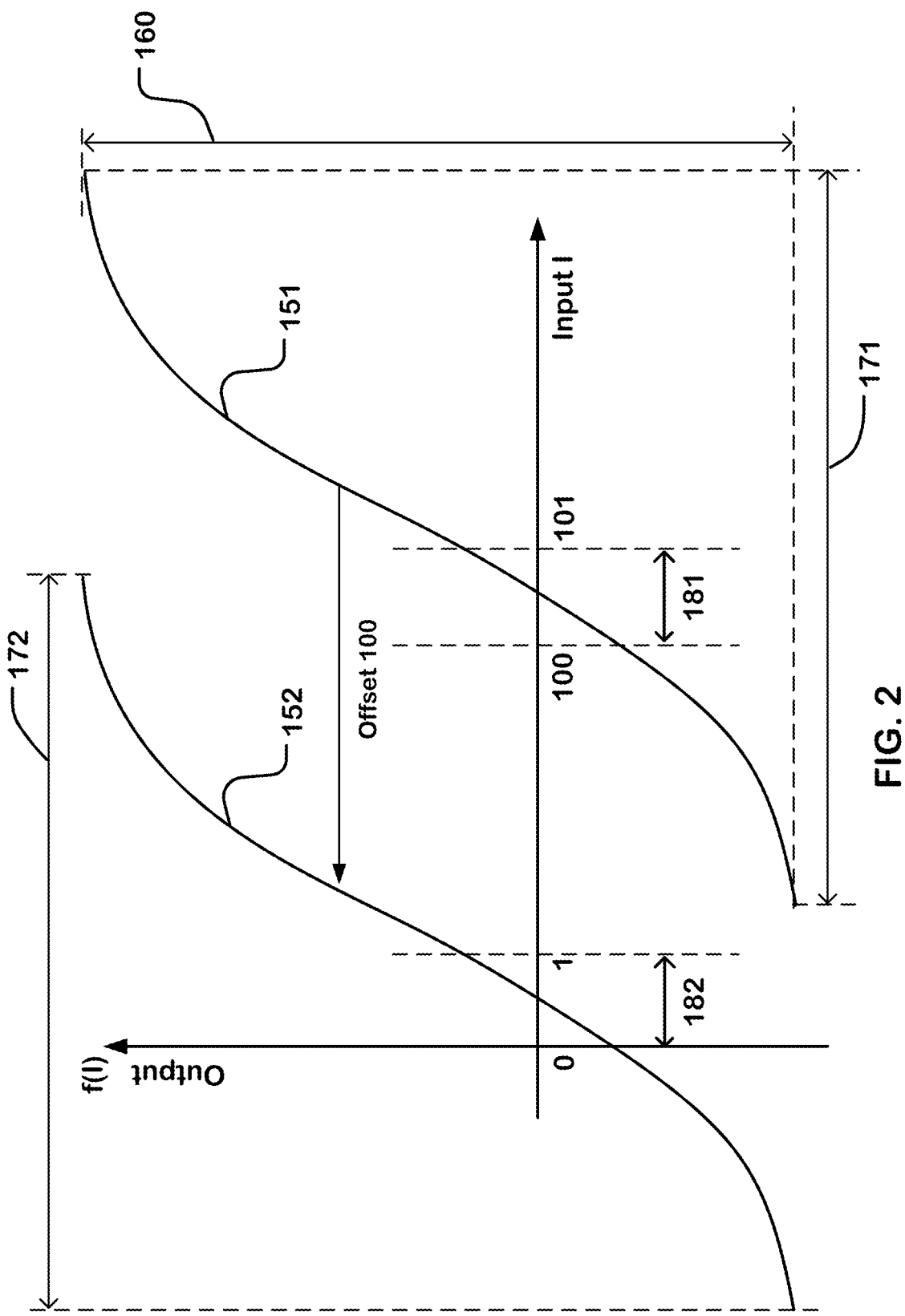
FIG. 2 is a plot of a function having a critical region.

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

FIG. 1A is a simplified schematic diagram illustrating a computation unit 101 for computing a function f(I) implemented using circuits suitable for integrated circuit processors. The function f(I) has a target output range over a first domain of an encoded input I, in which the rate of change of output values can be high, or in which greater resolution may be required for a given use of the data.

The computation unit in this example comprises a first circuit 110 receiving an encoded input I[31:0] in a first format including X bits (e.g. FP32), to add an offset C to the encoded input I to generate an offset input SI=I+C, in a second format including fewer than X bits (e.g. BF16). In the illustrated example, the second format is BF16, and so the FP32 format sum I+C is translated to the BF16 format offset input SI by truncation of the lower 16 bits, so that the offset input SI[31:16] can be said to include bits 31:16 of the sum. The offset C is equal to a difference between the first domain in inputs I for f(I) which produces outputs in the target range, and a higher precision domain of the encoding format for the offset input SI. The computation unit in this example comprises a second circuit 120, such as a lookup table, operatively coupled to receive the offset input SI in the second format, to output a value equal to a function f(SI-C) that can be, or can be used to provide, an encoded output value f(I). In some embodiments, the encoded output value f(I) is provided in the first format, FP32 in this example.

The encoded input I can be in the FP32 floating point format, which includes a sign bit, an 8-bit exponent and a 23 bit mantissa, for a total of 32 bits. The offset input SI[31:16] can be in the BF16 floating point format, which includes a sign bit, an 8-bit exponent and a 7-bit mantissa, for a total of 16 bits. The offset input SI[31:16] in the BF16 floating point format can have the upper 16 bits in the encoded input I in the FP32 floating point format.

In one embodiment, the second circuit 120 can comprise memory storing a lookup table LUT with entries for the encoded output value f(I), where the entries are addressed by the offset input SI. The encoded input I can have X bits (e.g. X=32 bits), the offset input can have less than X bits (e.g. 16 in the case in which SI is encoded in the BF16 format), and the lookup table in the second circuit can have less than $2^X$ entries, such as, up to $2^{16}$ entries for a 16 bit encoded input SI.

In an embodiment that receives a 32-bit input, and is required to output a 32-bit output, the encoded output value f(I) of the second circuit 120 can be 32 bits. The number of bits used to represent the output value, and the encoding format of the output value, can be selected according to a particular implementation.

A greater number of input values can be encoded in the higher precision domain of the encoding format for the offset input SI than in the critical region in the first domain in f(I), as further described in reference to FIG. 2. For instance, an offset region 182 in the higher precision domain 172 might be encoded with more than 15,000 values, while a critical region 181 in the first domain 171 might be encoded with less than 5 values.

FIG. 1B is a simplified schematic diagram illustrating an alternative computation unit 102, which includes an interpolation function which can improve the accuracy of the output f(I). Like the implementation shown in FIG. 1A, the function f(I) has a target output range over a first domain of an encoded input I. An encoded input I[31:0], a first circuit 110, and an offset input SI[31:16] are as described above in reference to FIG. 1A.

In this alternative embodiment, the second circuit can comprise an interpolation circuit, including memory 125 storing a first lookup table LUTa 121 with entries for a first parameter A addressed by the offset input SI, and a second lookup table with entries for a second parameter B addressed by the offset input SI. In other embodiments, the first and second lookup tables may be combined into a single table which has entries storing both A and B. The first and second lookup tables in memory 125 can output values equal to functions fa(SI-C) and fb(SI-C) that can be, or can be used to provide, parameters A and B, respectively, for an interpolation function. The encoded input I can have X bits (e.g. X=32 bits), the offset input can have less than X bits (e.g. 16 in the case in which SI is encoded in the BF16 format), and the first and second lookup tables in the second circuit can each have less than $2^X$ entries, such as, up to $2^{16}$ entries. The first and second parameters can be provided to a third circuit 130, which can be operatively coupled to the encoded input I, to compute the encoded output value f(I). The third circuit can execute an interpolation function such as (A*I+B) or other function using the encoded input I and the first and second parameters. In some embodiments, the encoded input I, the outputs of the first and second lookup tables, and the encoded output value can all be encoded using the first format, having X bits.

In alternative systems, different interpolation algorithms can be applied, using two or more than two interpolation parameters from lookup tables to provide the parameters of the interpolation algorithms.

FIG. 2 is a plot of a function having a critical region. A function f(I) 151 has a target output range 160 over a first domain 171 of an input I encoded using a first format, such as the FP32 floating point format. The derivative of the function f(I) can be large in a critical region 181 so that small changes in the input value can result in large changes in the output. If it is desirable to generate the output as a function of an input having a high dynamic range, such as represented by the FP32 format, using a lookup table, the lookup table would have to be very large. Thus, it is desirable to estimate the value of the output in these circumstances using a smaller table. For example, the input value might be truncated, and used as the input for a lookup table to provide estimated outputs that might be represented in a higher precision format. For an FP32 format floating point input, one could truncate the lower order 16 bits to produce a BF16 format floating point value to be used as an input to the lookup table. Using a smaller table introduces quantization error which may be tolerable in some regions of the output function, but not in regions such as a critical region 181, in which small changes in input value can result in very large changes in the output or which may be critical for a particular application of the data for other reasons.

As shown in the example of FIG. 2, a critical region 181 in the first domain in f(I) is between a minimum value 100 and a maximum value 101. These values are represented as illustrated assuming an FP32 input truncated into BP16 format, in which a function 151 has a greater number of output values than corresponding input values that can be encoded in a critical region 181 in the first domain 171 in f(I).

Table 1 illustrates the minimum and maximum values of the critical region 181 in decimal and the BF16 format.

TABLE 1

| decimal | BF16 |
| --- | --- |
| 100 | 0100 0010 1100 1000 |
| 101 | 0100 0010 1100 1010 |

As shown in the example of Table 1, the difference between the minimum and maximum values in the BF16 format is in the 2 least significant bits "00" for the decimal value "100" and "10" for the decimal value "101", respectively. In other words, between the minimum and maximum values in the BF16 format corresponding to the decimal values "100" and "101", there can be only one other value in the BF16 format which is "0100 0010 1100 1001". So the critical region can have only 3 input values. Consequently, any values between "100" and "101" in decimal will be truncated to one of the three values in the BF16 format for a lookup table, resulting in increased quantization error rates.

In contrast, an offset region 182 between "0" and "1" in a higher precision domain of the encoded input I can have more than 16,000 values. Table 2 illustrates the minimum and maximum values of the second region between "0" and "1" in decimal and the BF16 format.

TABLE 2

| decimal | BF16 |
| --- | --- |
| 0 | 0000 0000 0000 0000 |
| 1 | 0011 1111 1000 0000 |

As shown in the example of Table 2, the difference between the two values in the BF16 format is "11111110000000" in binary, which is 16,256 in decimal. Consequently, an offset region between "0" and "1" can represent more than 16,000 values in a higher precision domain.

To reduce error rates for a critical region while using the BF16 format, an offset C can be added to the encoded input I to generate an offset input SI=I+C, in a second format including fewer than X bits, so the function 151 having a target output range 160 over the first domain 171 of the encoded input I is shifted to an offset function 152 having the same target output range 160 over a higher precision domain 172 of the second format for the offset input SI. A greater number of input values can be encoded in an offset region 182 in the higher precision domain than in the critical region 181 in the first domain. The offset can be equal to a difference between the first domain in f(I) and the higher precision domain of the second format for the offset input SI, where the difference can be value determined empirically or more precisely computed based on the inputs values I that generate output in the critical region, desired accuracies and other factors. The technique of offsetting the encoded input I results in generating a value equal to a function f(SI-C) to provide an encoded output value f(I) that has higher resolution. In this example, an offset can be 100, so the critical region 231 between "100" and "101" can be offset by the offset of 100 to an offset region 182 between "0" and "1". In this example, the technique of offsetting the encoded input I improves the resolution from 3 values in the critical region 181 to more than 16,000 values in the offset region 182, resulting in decreased error rates for the critical region.

For the function to be offset into a higher precision domain, the offset can be large enough to cause a change in the E bit exponent of the encoded input I, so that quantization changes are substantially more than caused by a change in the M bit mantissa of the encoded input I. The BF16 floating point format has a sign bit, a 8 bit exponent, and a 7 bit mantissa, where the sign bit is the most significant bit. As shown in the example of Table 1, the difference between "100" and "101" in the BF16 format in the first domain is in the mantissa and not in the exponent. As shown in the example of Table 2, the difference between "0" and "1" in a higher precision domain is in both the exponent and the mantissa.

Figure 3:
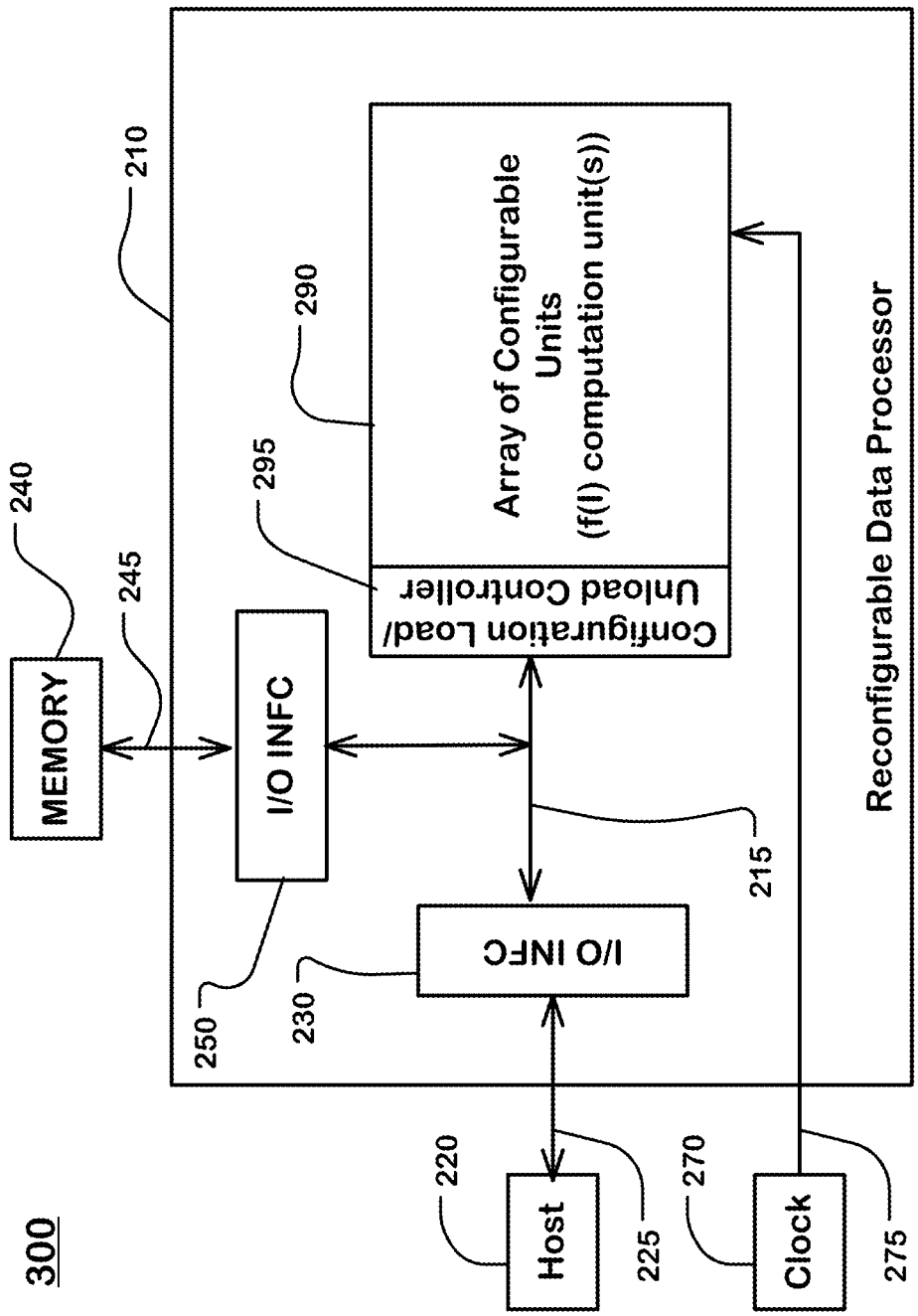
FIG. 3 is a system diagram illustrating a system including a host, a memory, and a reconfigurable data processor.

FIG. 3 is a diagram illustrating a system 300 including a host 220, a memory 240, and a reconfigurable data processor 210 in which a computation unit as described herein is deployed by hardware or by configuration of reconfigurable components. As shown in the example of FIG. 3, the reconfigurable data processor 210 includes an array 290 of configurable units and a configuration load/unload controller 295.

Figure 6:
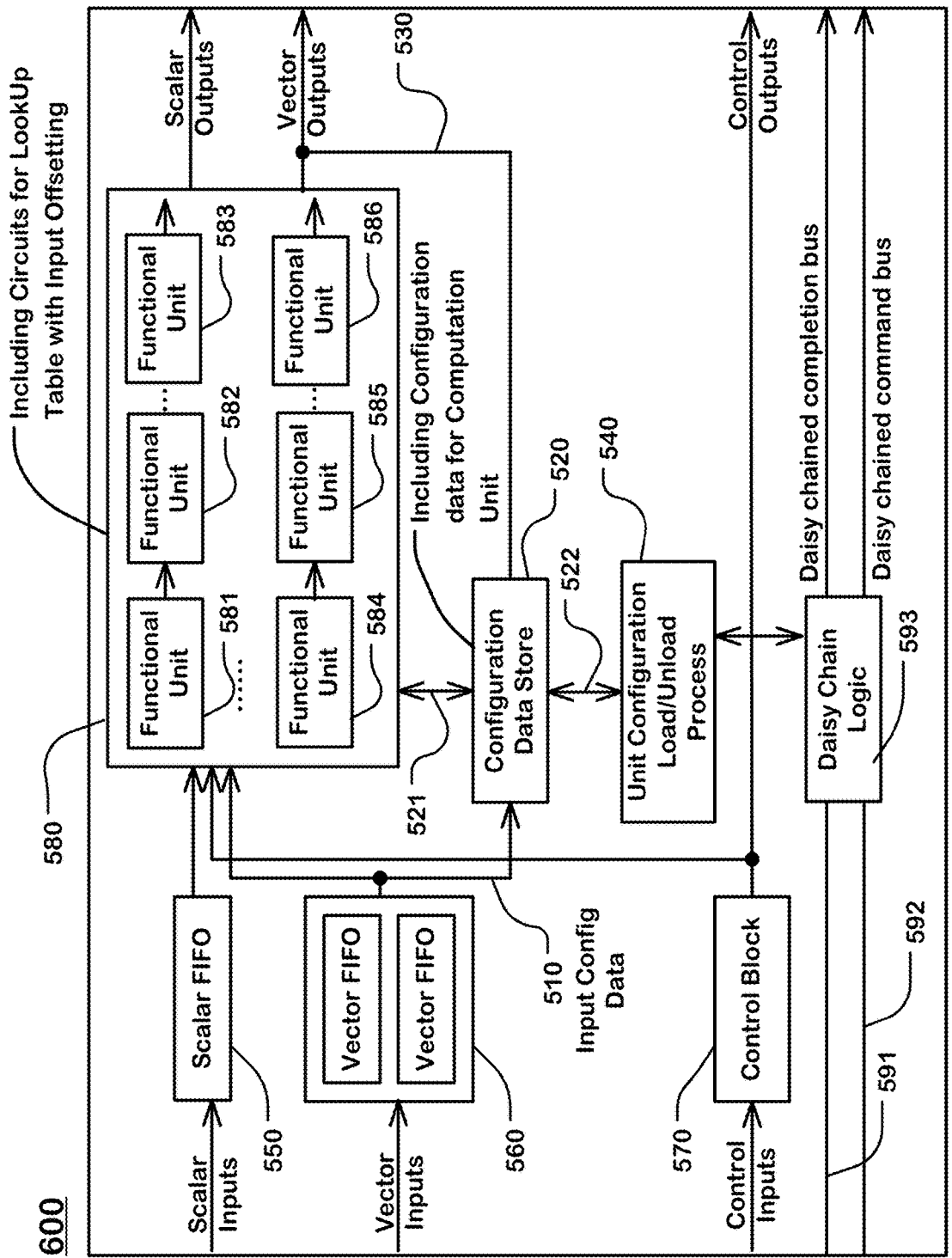
FIG. 6 is a block diagram illustrating an example configurable unit, such as a Pattern Compute Unit (PCU).
Figure 7:
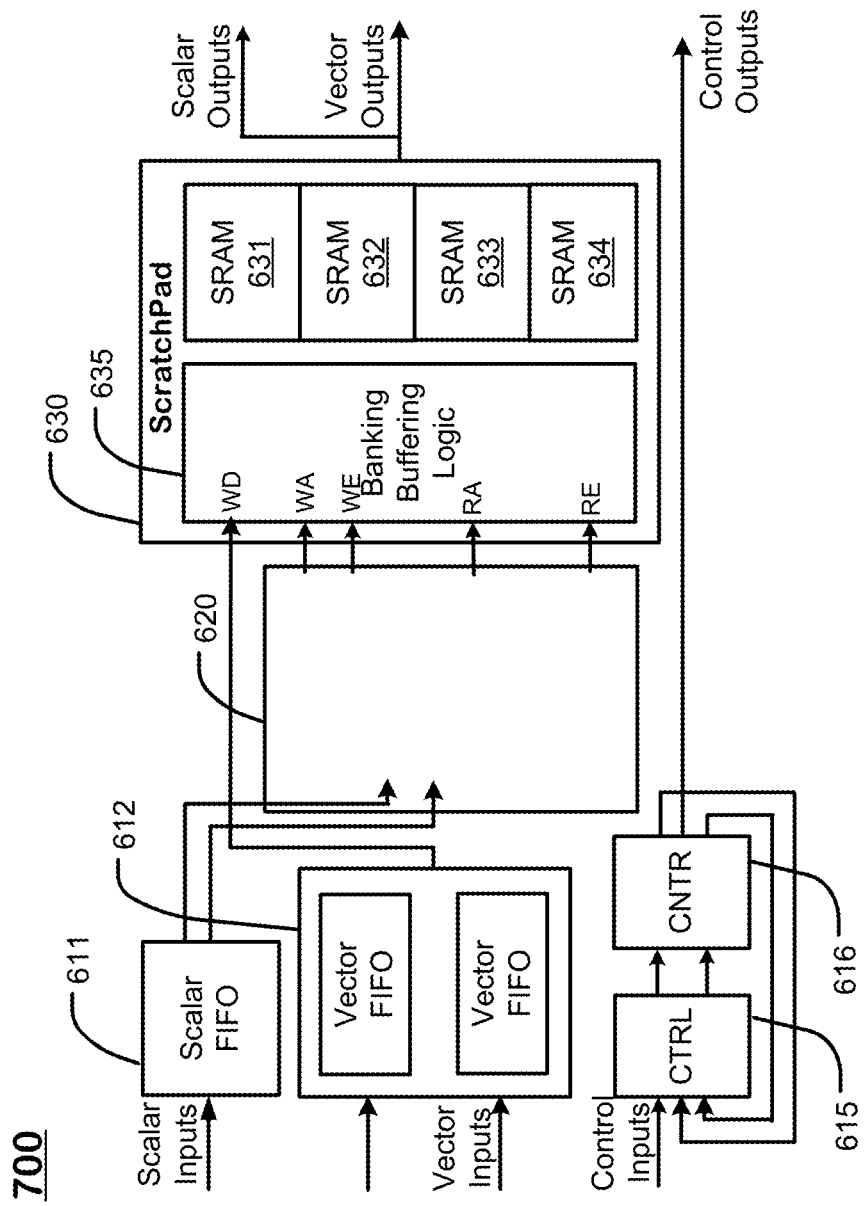
FIG. 7 is a block diagram illustrating an example configurable unit, such as a Pattern Memory Unit (PMU).

Configurable units in an array 290 of configurable units are further described in reference to FIGS. 6 and 7. Configurable units can include, or can have units configured to implement, a computation unit or computation units, as described herein.

The processor 210 includes an external I/O interface 230 connected to the host 220 by line 225, and an external I/O interface 250 connected to the memory 240 by line 245. The I/O interfaces 230, 250 connect via a bus system 215 to the array 290 of configurable units and to the configuration load/unload controller 295. The bus system 215 may have a bus width of carrying one chunk of data, which can be for this example 128 bits (references to 128 bits throughout can be considered as an example chunk size more generally).

To configure configurable units in the array 290 of configurable units with a configuration file, the host 220 can send the configuration file to the memory 240 via the interface 230, the bus system 215, and the interface 250 in the reconfigurable data processor 210. The configuration file can be loaded in many ways, as suits a particular architecture, including in data paths outside the configurable processor 210. The configuration file can be retrieved from the memory 240 via the memory interface 250. Chunks of the configuration file can then be sent in a distribution sequence to configurable units in the array 290 of configurable units in the reconfigurable data processor 210.

An external clock generator 270 or other clock line sources can provide a clock line 275 or clock lines to elements in the reconfigurable data processor 210, including the array 290 of configurable units, and the bus system 215, and the external data I/O interfaces. The bus system 215 can communicate data at a processor clock rate via a clock line 275 or clock lines.

Figure 4:
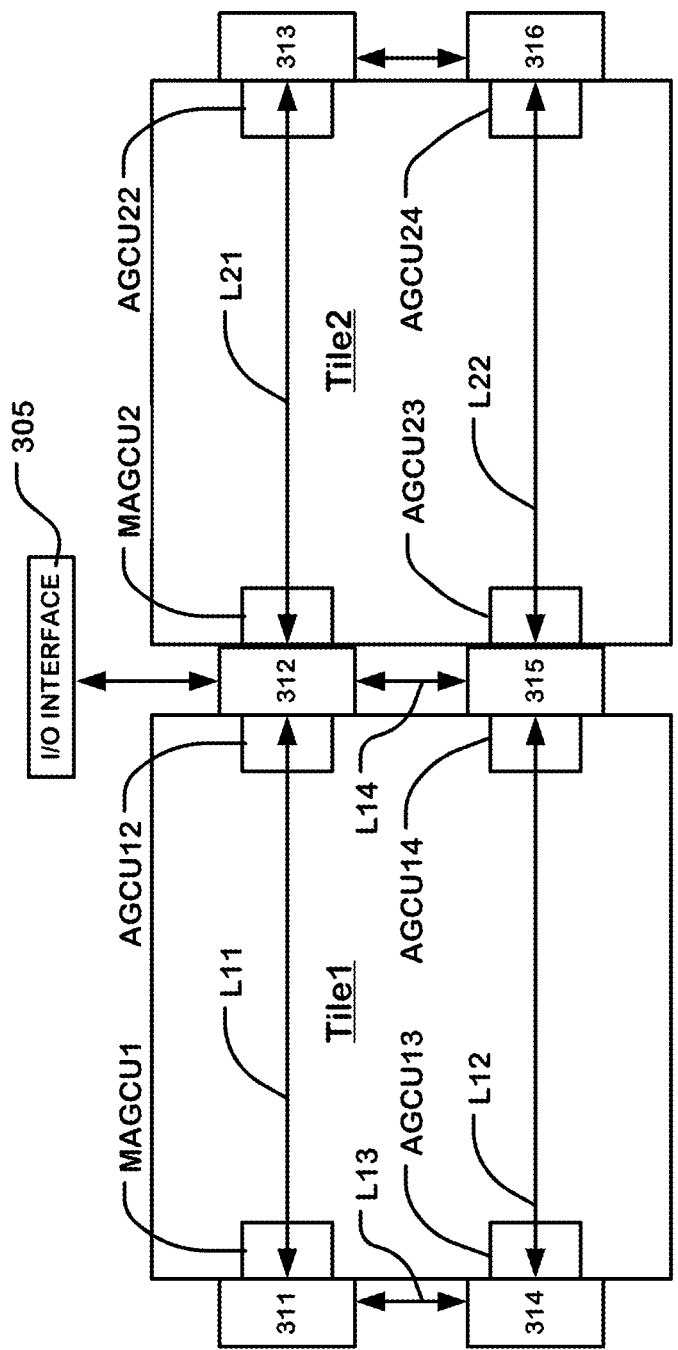
FIG. 4 is a simplified block diagram of a top level network and components of a CGRA (Coarse Grain Reconfigurable Architecture).

FIG. 4 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including array level networks in this example. An array of configurable units (e.g. 290, FIG. 2) in the tile includes computation units with input offsetting in hardware or by configuration of reconfigurable components. The bus system includes a top level network connecting the tiles to external I/O interface 305 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g. MAGCU1, AGCU12, AGCU13, AGCU14). The AGCUs are nodes on the top level network and nodes on the array level networks, and include resources for routing data among nodes on the top level network and nodes on the array level network in each tile.

Nodes on the top level network in this example include one or more external I/Os, including interface 305. The interfaces to external devices include resources for routing data among nodes on the top level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top level network and the array level network or networks.

The top level network is constructed using top level switches (311-316) connecting to each other as well as to other nodes on the top level network, including the AGCUs, and I/O interface 305. The top level network includes links (e.g. L11, L12, L21, L22) connecting the top level switches. Data travels in packets between the top level switches on the links, and from the switches to the nodes on the network connected to the switches. For example, top level switches 311 and 312 are connected by a link L11, top level switches 314 and 315 are connected by a link L12, top level switches 311 and 314 are connected by a link L13, and top level switches 312 and 313 are connected by a link L21. The links can include one or more buses and supporting control lines, including for example a chunk-wide bus (vector bus). For example, the top level network can include data, request and response channels operable in coordination for transfer of data in a manner analogous to an AXI compatible protocol. See, AMBA® AXI and ACE Protocol Specification, ARM, 2017.

Top level switches can be connected to AGCUs. For example, top level switches 311, 312, 314 and 315 are connected to MAGCU1, AGCU12, AGCU13 and AGCU14 in the tile Tile1, respectively. Top level switches 312, 313, 315 and 316 are connected to MAGCU2, AGCU22, AGCU23 and AGCU24 in the tile Tile2, respectively.

Top level switches can be connected to one or more external I/O interfaces (e.g. interface 305).

Figure 5A:
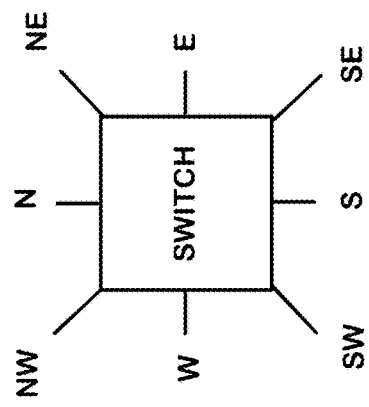
FIG. 5A illustrates an example switch unit connecting elements in an array level network.
Figure 5:
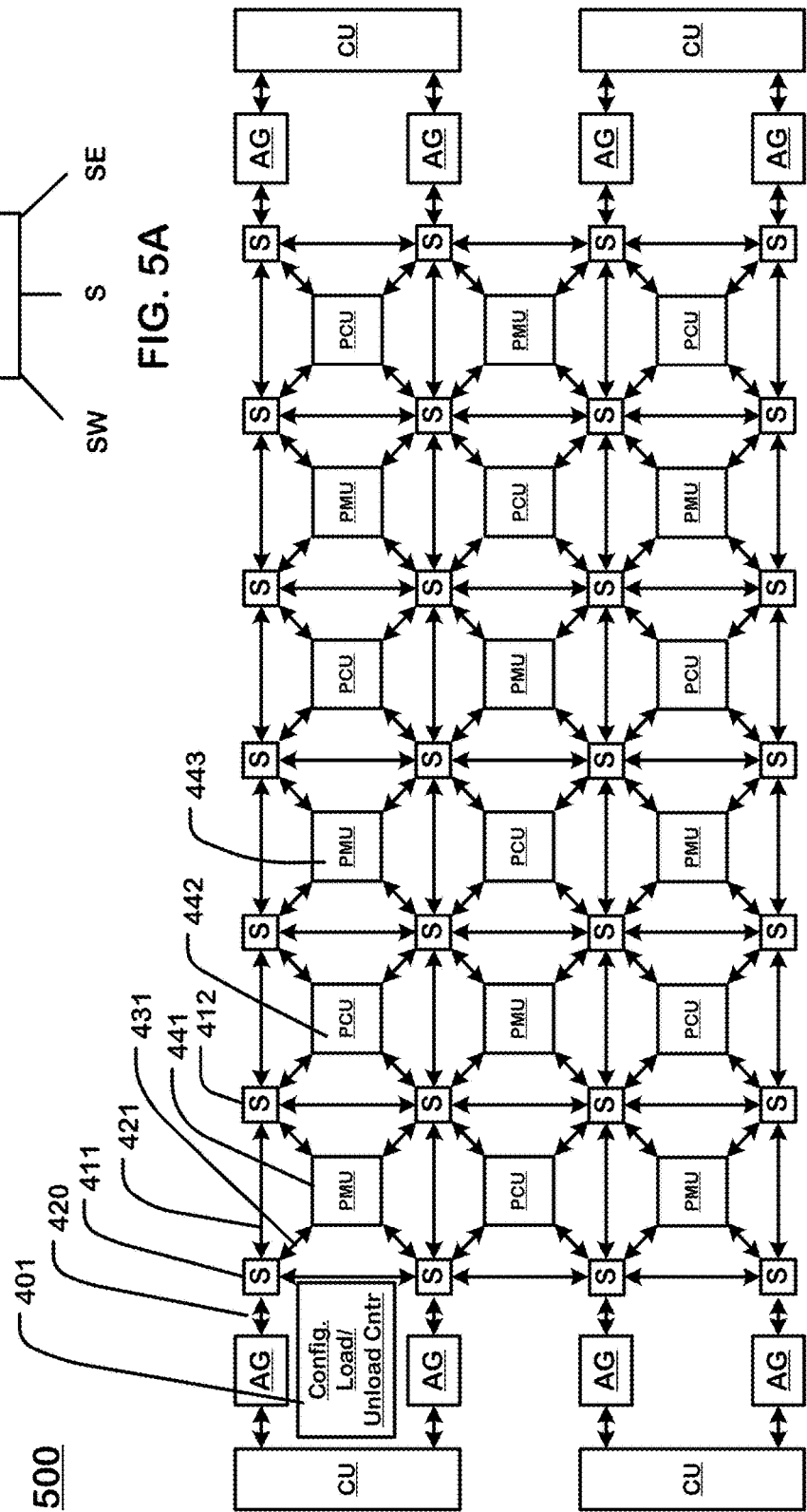
FIG. 5 is a simplified diagram of a tile and an array level network usable in the configuration of FIG. 3, where the configurable units are nodes on the array level network and are configurable to implement a lookup table with input offsetting.

FIG. 5 is a simplified diagram of a tile and an array level network usable in the configuration of FIG. 4, where the configurable units in the array are nodes on the array level network and are configurable to implement a lookup table with input offsetting.

Figure 8:
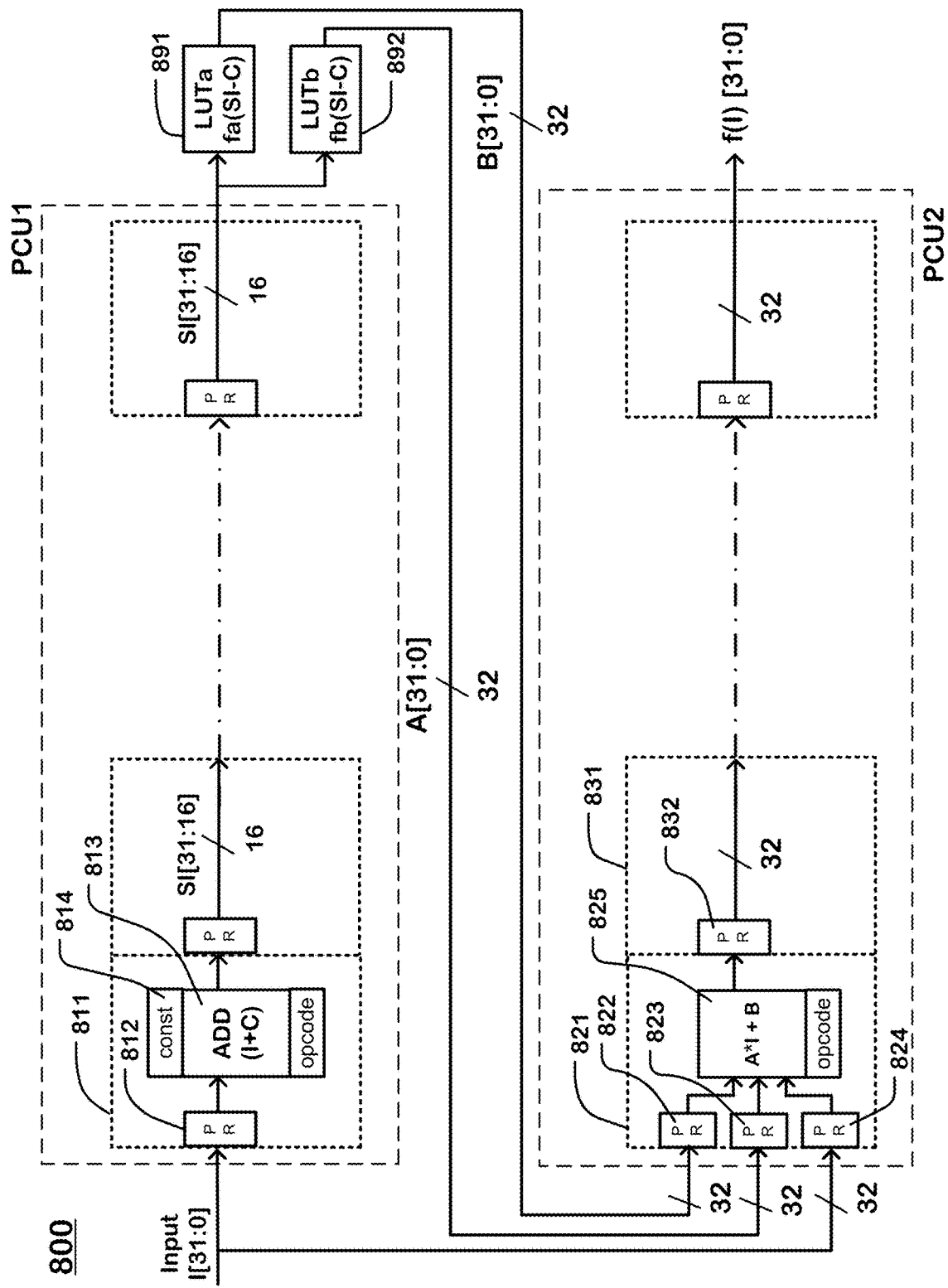
FIG. 8 illustrates example implementation of a circuit including a lookup table with input offsetting in configurable units.

In this example, the array of configurable units 500 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. In this example, the PCUs (e.g. 442) and PMUs (e.g. 443) in the array of configurable units 500 can include resources configurable for implementation of a computation unit, an example configuration of which is described herein (FIG. 8). Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the lookup table with input offsetting. Program Load may also require the load of all PMU memories.

The array level network includes links interconnecting configurable units in the array. The links in the array level network include one or more and, in this case, three kinds of physical buses: a chunk-level vector bus (e.g. 128 bits of data), a word-level scalar bus (e.g. 32 bits of data), and a multiple bit-level control bus. For instance, interconnect 421 between switch units 411 and 412 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:
  A bit to indicate if the chunk is scratchpad memory or configuration store data.
  Bits that form a chunk number.
  Bits that indicate a column identifier.
  Bits that indicate a row identifier.
  Bits that indicate a component identifier.

For a load operation, the configuration load controller can send the number N of chunks to a configurable unit in order from N−1 to 0. For this example, the 6 chunks are sent out in most-significant-bit-first order of Chunk 5->Chunk 4->Chunk 3->Chunk 2->Chunk 1->Chunk 0. (Note that this most-significant-bit-first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 5A illustrates an example switch unit connecting elements in an array level network. As shown in the example of FIG. 5A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 441 can be sent from the configuration load/unload controller 401 to the PMU 441, via a link 420 between the configuration load/unload controller 401 and the West (W) vector interface of the switch unit 411, the switch unit 411, and a link 431 between the Southeast (SE) vector interface of the switch unit 411 and the PMU 441.

In this example, one of the AGCUs is configured to be a master AGCU, which includes a configuration load/unload controller (e.g. 401). The master AGCU implements a register through which the host (220, FIG. 2) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 6). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (250, FIG. 3). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

FIG. 6 is a block diagram illustrating an example configurable unit 500, such as a Pattern Compute Unit (PCU). A configurable unit can interface with the scalar, vector, and control buses, in this example using three corresponding sets of inputs and outputs (TO): scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process, and transmitting and receiving data during operation after configuration across a long pipeline between multiple PCUs. Control IOs can be used to communicate signals on control lines such as the start or end of execution of a configurable unit. Control inputs are received by control block 570, and control outputs are provided by the control block 570.

Each vector input is buffered in this example using a vector FIFO in a vector FIFO block 560 which can include one or more vector FIFOs. Likewise in this example, each scalar input is buffered using a scalar FIFO 550. Using input FIFOs decouples timing between data producers and consumers, and simplifies inter-configurable-unit control logic by making it robust to input delay mismatches.

A configurable unit includes multiple reconfigurable data paths in block 580. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 520 is connected to the multiple data paths in block 580 via lines 521.

A configurable data path organized as a multi-stage pipeline can include multiple functional units (e.g. 581, 582, 583; 584, 585, 586) at respective stages. A computation unit or parts of a computation unit can be implemented in multiple functional units at respective stages in a multi-stage pipeline or in multiple multi-stage pipelines, as described in FIG. 8. In the example as shown in FIG. 8, a circuit including a lookup table with input offsetting can be implemented in multiple functional units and multiple memory units. Input registers in functional units can register inputs from scalar FIFOs 550 or Vector FIFOs 560 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 520 (e.g. serial chains) to store unit files comprising a plurality of chunks (or sub-files of other sizes) of configuration data particular to the corresponding configurable units. Configurable units in the array of configurable units each include unit configuration load logic 540 connected to the configuration data store 520 via line 522, to execute a unit configuration load process. The unit configuration load process includes receiving, via the bus system (e.g. the vector inputs), chunks of a unit file particular to the configurable unit, and loading the received chunks into the configuration data store 520 of the configurable unit. The unit file loaded into the configuration data store 520 can include configuration data, including opcodes and routing configuration, for circuits (e.g. module) implementing a lookup table with input offsetting in multiple functional units and multiple memory units, as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 510 can be provided to a vector FIFO as vector inputs, and then be transferred to the configuration data store 520. Output configuration data 530 can be unloaded from the configuration data store 520 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 6, a daisy-chained completion bus 591 and a daisy-chained command bus 592 are connected to daisy-chain logic 593, which communicates with the unit configuration load logic 540. The daisy-chain logic 593 can include load complete status logic, as described below. The daisy-chained completion bus is further described below. Other topologies for the command and completion buses are clearly possible but not described here.

FIG. 7 is a block diagram illustrating an example configurable unit 700, such as a Pattern Memory Unit (PMU). A PMU can contain scratchpad memory 630 coupled with a reconfigurable scalar data path 620 intended for address calculation (RA, WA) and control (WE, RE) of the scratchpad memory 630, along with the bus interfaces used in the PCU (FIG. 6).

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g. 631-634). Banking and buffering logic 635 for the SRAM banks in the scratchpad can be configured to operate in several banking modes to support various access patterns. A computation unit as described herein can include a lookup table stored in the scratchpad memory 630, from a configuration file or from other sources. In a computation unit as described herein, the scalar data path 620 can translate a section of a raw input value I for addressing lookup tables implementing a function f(I), into the addressing format utilized by the SRAM scratchpad memory 630, adding appropriate offsets and so on, to read the entries of the lookup table stored in the scratchpad memory 630 using the sections of the input value I. Each PMU can include write address calculation logic and read address calculation logic that provide write address WA, write enable WE, read address RA and read enable RE to the banking buffering logic 635. Based on the state of the local FIFOs 611 and 612 and external control inputs, the control block 615 can be configured to trigger the write address computation, read address computation, or both, by enabling the appropriate counters 616. A programmable counter chain (Control Inputs, 616, Control Outputs) and control block 615 can trigger PMU execution.

Lookup tables (e.g. 120, 121, 122) as described in reference to FIGS. 1A and 1B can be implemented in SRAM banks (e.g. 631-634).

FIG. 8 illustrates example implementation of a computation unit configuration of configurable units in an array of configurable units in a reconfigurable data processor, like that represented by FIG. 3-7. Thus, in a reconfigurable data processor, in an array of configurable units connected to a bus system, configurable units in the array include configuration data stores to store configuration data that establishes data flow and execution parameters for a machine. The machine can include a computation unit formed at least in part using the configurable resources in the array as illustrated in FIG. 8. As discussed above, the configurable units in the array can include execution units, configurable using a configuration file to execute a number of functions. In some embodiments, the configuration file can provide an opcode to specify the function to be executed, and the constant which can be used as immediate data in the execution of the function. In some embodiments, the opcode and immediate data can be provided from other sources.

In the configuration illustrated in FIG. 8, an Input I encoded using a first format is supplied to the computation unit. The input I has a sign bit, an E bit exponent and an M bit mantissa. For instance, the encoded input I can be in the FP32 floating point format, which includes a sign bit, an 8-bit exponent and a 23 bit mantissa, for a total of 32 bits.

In this example, the array of configurable units is configured to implement the computation unit using resources in a first PCU PCU1 and a second PCU PCU2. Also, the computation unit includes memory storing lookup tables in at least one PMU, including a lookup table LUTa 891 with entries for the first parameter A of an interpolation, and lookup table LUTb 892 with entries for the second parameter B of the interpolation.

A first circuit 811 in the PCU1 has an input register 812 registering the encoded input I and stores a constant value in a constant register 814. The PCU1 receives all 32 bits of the encoded input I, and applies it to the first circuit 811 in the PCU1 configured to execute an ADD operation 813, which adds an offset C to the encoded input I by an amount as indicated by the constant value stored in the constant register 814 by the configuration file, to generate an offset input SI=I+C. This offset input SI is propagated through a sequence of pipeline registers in PCU1, and routed by the configuration file as an input to the lookup tables (e.g. 891, 892) stored in the at least one PMU. In an alternative embodiment, the first circuit 811 in the PCU1 can be configured to execute a subtraction operation to subtract an offset having an opposite sign relative to the first-mentioned offset used with an ADD operation, to generate the same offset input SI.

In one embodiment, the offset input SI[31:16] is in the BF16 floating point format, and truncated from the output of the ADD operation on encoded input I[31:0] which is in the FP32 floating point format. As shown in the example of FIG. 8, lookup tables 891 and 892 each have up to $2^{16}$ entries. Outputs of the lookup tables and of the PCU2 have X=32 bits.

The 16 bits of the offset input SI are routed to the PMU or PMUs storing the lookup tables LUTa and LUTb, which use it to look up entries in the corresponding tables. The outputs of LUTa and LUTb are applied to pipeline registers 822, 823. A functional unit 821 in the PCU2 is configured by the configuration file to execute a multiply and add operation 825 to calculate the interpolation value (A*I+B), and to apply its output to the pipeline register 832 in a second functional unit 831 in the PCU2. The functional unit 821 outputs a value equal to a function f(SI-C) to provide an encoded output value f(I)[31:0]. The interpolated value is propagated through a sequence of pipeline registers in the PCU2, and routed to an output of the PCU2 as illustrated.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Figure 9:
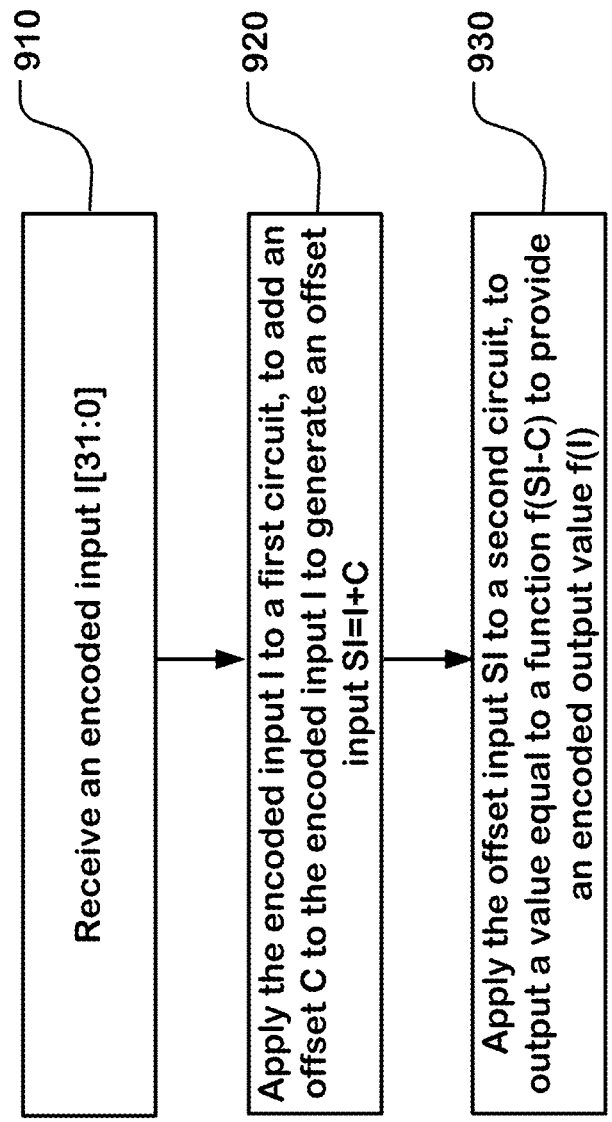
FIG. 9 is a flowchart illustrating a method for computing a function f(I).

FIG. 9 is a flowchart illustrating a method for computing a function f(I), where the function f(I) has a target output range over a first domain of an input I encoded using a first format. According to the flowchart at Step 910, an encoded input I is received, which can include for example 32 bits, I[31:0]. If the encoded input is in a floating point format, then it includes a sign bit, an E bit exponent and a M bit mantissa.

At Step 920, the encoded input I in the first format including X bits is applied to a first circuit, to add an offset C to the encoded input I to generate an offset input SI=I+C, in a second format including fewer than X bits, where the offset C can be equal to a difference between the first domain in f(I) and a higher precision domain of the second format for the offset input SI. For instance, a critical region in the first domain in f(I) can have less than 5 values and an offset region in the higher precision domain of the second format for the offset input SI can have more than 15,000 values, as described in reference to FIG. 2.

At Step 930, the offset input SI in the second format is applied to a second circuit, to output a value equal to a function f(SI-C) to provide an encoded output value f(I). In one embodiment, the second circuit comprises memory storing a lookup table with entries for the encoded output value f(I), and the entries in the lookup table can be addressed using the offset input SI. The encoded input I can have X bits, the offset input can have less than X bits, and the lookup table can have less than $2^X$ entries. For instance, the offset input can have X/2 bits, and the lookup table can have $2^{X/2}$ entries, where X=32.

In an alternative embodiment, the second circuit can include an interpolation circuit, including memory storing a first lookup table with entries for a first parameter A addressed by the offset input SI, and a second lookup table with entries for a second parameter B addressed by the offset input SI. The encoded input I can have X bits, the offset input can have less than X bits, and the first and second lookup tables can have less than $2^X$ entries. For instance, the offset input can have X/2 bits, and the lookup table can have $2^{X/2}$ entries, where X=32. A third circuit can be operatively coupled to the encoded input I, and the first and second parameters can be provided to the third circuit. The encoded input I can be applied to the third circuit, to compute the encoded output value f(I) using the encoded input I. An interpolation function can be executed using the encoded input I and the first and second parameters in the third circuit. The third circuit can execute an interpolation function such as (A*I+B) or other function using the encoded input I and the first and second parameters. In some embodiments, the encoded input I, the outputs of the first and second lookup tables, and the encoded output value can all be encoded using the first format, having X bits.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A computation unit for a function f(I), the function f(I) having a target output range in a critical region of a first input domain of an input I encoded using a first floating point format, comprising:
 a first circuit, receiving the encoded input I in the first floating point format including X bits, to add an offset C to the encoded input I and to generate an offset input SI=I+C in a second format including fewer than X bits to offset the first input domain, including the critical region, to an offset input domain with an offset critical region, the second format having a first number of values in the critical region and a second number of values in the offset critical region of the offset input domain, the second number of values being greater than the first number of values, the offset C being equal to a difference between the critical region of the first input domain and the offset critical region of the offset input domain; and
 a second circuit, operatively coupled to receive the offset input SI in the second format, to provide an encoded output value f(I), the second circuit providing a greater number of encoded output values for inputs in the critical region than the first number of values, and wherein the second circuit comprises memory storing a lookup table with entries for the encoded output value f(I), the entries addressed by the offset input SI.

2. The computation unit of claim 1, wherein the first floating point format of the encoded input I has X bits, the second format of the offset input has less than X bits, and the lookup table has less than 2' entries.

3. The computation unit of claim 1, wherein the first circuit has an input register registering the encoded input I and stores a constant, including logic to execute an operation to add the constant to the encoded input I, the constant representing the offset.

4. The computation unit of claim 1, wherein the second format is a floating point format different than the first floating point format.

5. A computation unit for a function f(I), the function f(I) having a target output range in a critical region of a first input domain of an input I encoded using a first floating point format, comprising:
 a first circuit, receiving the encoded input I in the first floating point format including X bits, to add an offset C to the encoded input I and to generate an offset input SI=I+C in a second format including fewer than X bits to offset the first input domain, including the critical region, to an offset input domain with an offset critical region, the second format having a first number of values in the critical region and a second number of values in the offset critical region of the offset input domain, the second number of values being greater than the first number of values, the offset C being equal to a difference between the critical region of the first input domain and the offset critical region of the offset input domain; and
 a second circuit, operatively coupled to receive the offset input SI in the second format, to provide an encoded output value f(I), the second circuit providing a greater number of encoded output values for inputs in the critical region than the first number of values, wherein the second circuit comprises a third circuit, and a memory storing a first lookup table with entries for a first parameter addressed by the offset input SI, and a second lookup table with entries for a second parameter addressed by the offset input SI.

6. The computation unit of claim 5, wherein the first floating point format of the encoded input I has X bits, the second format of the offset input has less than X bits, and the first and second lookup tables have less than 2' entries.

7. The computation unit of claim 6,
 wherein the third circuit is operatively coupled to the encoded input I, to compute the encoded output value f(I), the first and second parameters being provided to the third circuit.

8. The computation unit of claim 7, wherein the third circuit executes an interpolation function using the encoded input I and the first and second parameters.

9. The computation unit of claim 7, wherein the first floating point format of the encoded input I, the outputs of the first and second lookup tables, and the encoded output value have X bits.

10. A method for computing a function f(I), the function f(I) having a target output range in a critical region of a first input domain of an input I encoded using a first floating point format, the method comprising:
 applying the encoded input I in the first format including X bits to a first circuit, to add an offset C to the encoded input I and to generate an offset input SI=I+C in a second format including fewer than X bits to offset the first input domain, including the critical region, to an offset input domain with an offset critical region, the second format having a first number of values in the critical region and a second number of values in the offset critical region of the offset input domain, the second number of values being greater than the first number of values, the offset C being equal to a difference between the critical region of the first input domain and the offset critical region of the offset input domain; and
 applying the offset input SI in the second format to a second circuit, to provide an encoded output value f(I), the second circuit providing a greater number of encoded output values for inputs in the critical region than the first number of values, and wherein the second circuit comprises memory storing a lookup table with entries for the encoded output value f(I), the entries addressed by the offset input SI.

11. The method of claim 10, wherein the first floating point format of the encoded input I has X bits, the second format of the offset input has less than X bits, and the lookup table has less than 2' entries.

12. The method of claim 10, wherein the first circuit has an input register registering the encoded input I and stores a constant, the method further comprising:
 executing an operation to add the constant to the encoded input I, the constant representing the offset.

13. The method of claim 10, wherein the second format is a floating point format different than the first floating point format.

14. A method for computing a function f(I), the function f(I) having a target output range in a critical region of a first input domain of an input I encoded using a first floating point format, the method comprising:
 applying the encoded input I in the first format including X bits to a first circuit, to add an offset C to the encoded input I and to generate an offset input SI=I+C in a second format including fewer than X bits to offset the first input domain, including the critical region, to an offset input domain with an offset critical region, the second format having a first number of values in the critical region and a second number of values in the offset critical region of the offset input domain, the second number of values being greater than the first number of values, the offset C being equal to a difference between the critical region of the first input domain and the offset critical region of the offset input domain; and applying the offset input SI in the second format to a second circuit, to provide an encoded output value f(I), the second circuit providing a greater number of encoded output values for inputs in the critical region than the first number of values, wherein the second circuit comprises a third circuit, and a memory storing a first lookup table with entries for a first parameter, and a second lookup table with entries for a second parameter, the method further comprising:

addressing the entries of the first and second look tables using the offset input SI.

15. The method of claim 14, wherein the first floating point format of the encoded input I has X bits, the second format of the offset input has less than X bits, and the first and second lookup tables have less than $2^I$ entries.

16. The method of claim 14, wherein the third circuit is operatively coupled to the encoded input I and the first and second parameters are provided to the third circuit, the method further comprising:

applying the encoded input I to the third circuit to compute the encoded output value f(I) using the encoded input I.

17. The method of claim 16, further comprising:

executing an interpolation function using the encoded input I and the first and second parameters in the third circuit.

18. The method of claim 16, wherein the first floating point format of the encoded input I, the outputs of the first and second lookup tables, and the encoded output value have X bits.

19. A reconfigurable data processor, comprising:

a bus system;

an array of configurable logic circuits connected to the bus system, configurable logic circuits in the array including configuration data stores to store configuration data to implement a computation unit for a function f(I), the function f(I) having a target output range in a critical region of a first input domain of an input I encoded using a first floating point format, the computation unit comprising:

a first circuit, receiving the encoded input I in the first floating point format including X bits, to add an offset C to the encoded input I and to generate an offset input SI=I+C in a second format including fewer than X bits to offset the first input domain, including the critical region, to an offset input domain with an offset critical region, the second format having a first number of values in the critical region and a second number of values in the offset critical region of the offset input domain, the second number of values being greater than the first number of values, the offset C being equal to a difference between the critical region of the first input domain and the offset critical region of the offset input domain; and a second circuit, operatively coupled to receive the offset input SI in the second format, to output a value equal to a function f(SI-C) to provide an encoded output value f(I), the second circuit providing a greater number of encoded output values for inputs in the critical region than the first number of values.

20. The reconfigurable data processor of claim 19, wherein the second circuit comprises memory storing a lookup table with entries for the encoded output value f(I), the entries addressed by the offset input SI.

21. The reconfigurable data processor of claim 20, wherein the first floating point format of the encoded input I has X bits, the offset input has less than X bits, and the lookup table has less than $2^I$ entries.

22. The reconfigurable data processor of claim 19, wherein the second circuit comprises an interpolation a third circuit, including and a memory storing a first lookup table with entries for a first parameter addressed by the offset input SI, and a second lookup table with entries for a second parameter addressed by the offset input SI.

23. The reconfigurable data processor of claim 22, wherein the first floating point format of the encoded input I has X bits, the second format of offset input has less than X bits, and the first and second lookup tables have less than $2^I$ entries.

24. The reconfigurable data processor of claim 22, wherein the third circuit is operatively coupled to the encoded input I, to compute the encoded output value f(I), the first and second parameters being provided to the third circuit.

25. The reconfigurable data processor of claim 24, wherein the third circuit executes an interpolation function using the encoded input I and the first and second parameters.

26. The reconfigurable data processor of claim 24, wherein the encoded input I, the outputs of the first and second lookup tables, and the encoded output value are encoded in the first floating point format.

27. The reconfigurable data processor of claim 19, wherein the first circuit has an input register registering the encoded input I and stores a constant, including logic to execute an operation to add the constant to the encoded input I, the constant representing the offset.

28. The reconfigurable data processor of claim 19, wherein the second format is a floating point format different than the first floating point format.

* * * * *